Jan. 5, 1960 W. A. RAY 2,920,254
SOLENOID DEVICE FOR USE WITH GAS VALVES
Filed July 18, 1957 3 Sheets-Sheet 1

Fig.1

Inventor,
WILLIAM A. RAY
John H. Rouse,
Attorney

Jan. 5, 1960 W. A. RAY 2,920,254
SOLENOID DEVICE FOR USE WITH GAS VALVES
Filed July 18, 1957 3 Sheets-Sheet 2

Inventor
WILLIAM A. RAY
John H. Rouse,
Attorney

Jan. 5, 1960 W. A. RAY 2,920,254
SOLENOID DEVICE FOR USE WITH GAS VALVES
Filed July 18, 1957 3 Sheets-Sheet 3

Inventor
WILLIAM A. RAY
By John H. Rouse,
Attorney

United States Patent Office 2,920,254
Patented Jan. 5, 1960

2,920,254

SOLENOID DEVICE FOR USE WITH GAS VALVES

William A. Ray, North Hollywood, Calif., assignor to General Controls Co., Glendale, Calif., a corporation of California Application July 18, 1957, Serial No. 672,688

27 Claims. (Cl. 317—191)

The present invention relates to solenoid devices for operating valves, switching mechanisms and other control devices and, more particularly, to solenoid operators and solenoid valves energizable by the current supplied by the ordinary alternating current service. The present application constitutes a continuation in part of each of my three applications, Serial No. 545,329, filed November 7, 1955; Serial No. 562,443, filed January 31, 1956; and Serial No. 594,280, filed June 27, 1956, each of which was allowed to become abandoned in favor of the present application.

A main feature of the present invention resides in the use of viscous liquid such as oil to prevent or substantially eliminate the vibration or hum otherwise caused by movement of the armature or plunger into and out of engagement with the electromagnetic structure under the steady influence of alternating current.

Much effort has heretofore been expended in developing alternating current solenoids for the purpose of quelling alternating current hum. In these endeavors many different expedients have heretofore been used. For example, special shapes of magnetizable plungers, special shapes of stationary magnetizable structures and specially designed springs have been devised, usually operating in conjunction with shading coils. In contrast to such developments, the arrangements shown herein for quelling hum are relatively simple and involve the use of a liquid between the movable and stationary structures for quelling hum which is otherwise produced by longitudinal and/or radial movement of the energized plunger. For these purposes, the viscosity of such liquid, which may be oil, glycerin, silicone fluid, and the like, is related to the amount of surface area between the relatively movable parts and their distance of separation, i.e., the thickness of the oil film between the relatively movable parts. Such oil film cooperating with such relatively movable parts serves to quell hum, not only when the plunger is in a first extreme position to which it is moved by the associated coil energized with alternating current, but also when and as such plunger is being moved to such first extreme position.

In these arrangements, the plunger is usually biased by spring means so that the plunger may automatically return to a second extreme position, i.e., a de-energized position whereby a valve element connected to such plunger may, for example, return to a closed position. Such valve element is permitted to move at a relatively low rate towards such first extreme position when the associated solenoid is energized, such rate being low relative to the rate at which the energizing current undergoes alternations, e.g., one-sixtieth of a second in the case of a 60 cycle energizing source.

Since the viscosity of a fluid is related to the spacing and area between relatively movable parts in its function of permitting plunger movements at a low rate while substantially preventing movements at a high rate, i.e., at the hum rate, the fluid may be considered as being analogous to an element of a low pass mechanical filter. Much thought has been devoted in an attempt to characterize the action of such fluid in quelling hum, and this analogy to a low pass filter is offered as characterizing the functioning of the fluid, since the results obtained clearly appear to be in accord with the definition of a low pass mechanical filter, i.e., a mechanical structure which permits movement at a relatively low rate but substantially prevents or substantially attenuates movements at high rates. In the present instance, such high rate is a rate commensurate with the rate at which the energizing alternating current undergoes alternations.

Another theory advanced is that the fluid, because of its viscosity and its use in a thin film between relatively movable parts, has certain adhesive qualities and acts in a manner analogous to a fluid glue; and, hence, the term "fluid glue" has been used in characterizing the behavior of the thin viscous layer of fluid at that stage of operation when the plunger is in its extreme energized position. There appears to be some basis for this analogy to a gluing or adhesive action of the fluid, particularly since the oil is used in the condition of a thin viscous film between closely spaced boundary surfaces wherein capillary and required shearing forces are more pronounced than is the case when the oil appears in larger bulk between surfaces that are spaced apart a greater distance.

Further, the oil film between the magnetizable plunger and stationary structure can be considered to be a static oil film. This is so in the present arrangement since there is required to be no flow passage between the magnetizable plunger and the stationary structure. The close spacing between the plunger and its stationary structure is used to advantage in achieving an arrangement which may be considered analagous to a low pass filter as explained herein wherein shearing stresses are developed and resisted in the oil film. If no bypass were provided, it would then be necessary to cause the fluid to flow between the plunger and the stationary structure and in such case, the fluid being in a flowing condition is not in a condition to or adaptable to develop and resist shearing stresses. Hence the oil film in the present arrangement is considered to be a static oil film in that a bypass is expressly provided so that the oil film is not required to be "washed out" during movement of the plunger.

In each of the arrangements described herein, a thin film of viscous oil or the like acts between relatively movable parts to quell hum either while the plunger is being moved by the solenoid or while the plunger is maintained in its extreme energized position. It will be observed also that such thin film has its ends in communication with a larger body of oil which is allowed to move through an unrestricted passageway that may be considered to be a bypass passageway around the oil film. However, as shown in my copending application, Serial No. 606,115, filed August 24, 1956, a check valve may be interposed in such bypass passageway for purposes of retarding movement of the plunger to its fully energized position to achieve a slow opening and fast closing of the valve element connected to the plunger.

Further, while in each of the arrangements shown herein the plunger in its extreme energized position does not engage a stop and in that sense is "free floating," this hum quelling feature is obtained also when the energized plunger engages a stop as shown in my copending application, Serial No. 611,543, filed September 24, 1956.

It will therefore be understood that this hum quelling feature is obtainable with or without the plunger engaging a stop or with or without a valve in the so-called fluid bypass circuit around the thin oil film.

Solenoid devices in accordance with the present invention have particular utility in combination with a fluid control valve. This is the case, for example, in connection with a valve for controlling the supply of fuel gas to a furnace burner since if the initial supply of gas is too high a rate, there is a likelihood of "roll back" (which seldom is dangerous but is alarming and may cause extinguishment of the pilot burner) of the fire which may occur before the furnace stack has reached the temperature necessary to produce sufficient draft. The oil in this instance slows up operation of the plunger and the valve element connected thereto so as to substantially eliminate the danger of such "roll back."

In regard to the hum of an ordinary solenoid operator, I have found that it is caused not only by radial vibration of the plunger into and out of engagement with the side of the guide tube at the peak and zero point of the A.C. cycle, but also by vibration of the plunger along the axis of its operative movement and/or the resultant reactionary vibration of the solenoid coil and its magnetic frame. It is this axial vibration that is probably the more productive of the A.C. hum especially, but not only, when the plunger is arranged so that it floats in the magnetic field while the solenoid is energized. By the use of liquid of high viscosity, however, the action of the film of liquid in the present arrangement, due to its adhesive nature, "gluing action," or its function as an element of a low pass filter in the clearance space between the plunger and its guide, substantially prevents both radial and axial vibration of the plunger and/or the solenoid parts at the relatively high rate (for example, 60 cycles per second) of alternation of the current, while permitting gradual (i.e., from a fraction of a second up to a few seconds) operative movements of the plunger.

Even if the plunger were suspended (as, for example, by rubber bellows at each end) entirely free from its normal guide so that it could vibrate without producing A.C. hum, in the absence of the viscous liquid hum would still be produced by vibration of the normally stationary solenoid parts under the forces of reaction. However, the liquid acting as an element of a low pass filter imposes such a high rate of resistance to movement at the A.C. frequency that, for all practical purposes, the plunger becomes part of the guide tube, and the reaction forces are counteracted. The bond is so strong during the brief periods between alternations of the current that there is no perceptible movement of the liquid and the parts bonded by the liquid. For these reasons, the thin film of liquid may be compared to a "fluid glue."

In accordance with different forms of the present invention, in order to maintain an adequate supply of liquid, I provide a housing, preferably of thin nonmagnetic material, which sealingly encompasses the armature; and to operate through this housing without breaking the seal, I connect to the armature (within the housing) a magnetic member which, in operative movements of the armature, is brought into and out of good flux linking relation to another magnetic member outside the housing and connected to a device to be operated, at least one of said magnetic members comprising a permanent magnet whereby movement outside of the housing is effected in operative movements of the armature.

In each of the arrangements, the degree of viscosity of the liquid suitable for preventing relative movement of the parts depends mainly upon the mutual area of the parts between which the liquid acts in its "gluing" capacity and upon the force tending to separate the parts at the zero point of the A.C. cycle, liquid of even relatively low viscosity (such as light machine oil) being suitable when the mutual area is very large and the separating force is weak.

It is therefore a general object of the present invention to provide an alternating current electromagnetic operator which is hum free, consumes a relatively small amount of current and is highly effective and reliable.

Another object of the present invention is to provide an electromagnetic operator of this character in which liquid of suitable viscosity is present between relatively movable parts and prevents separation of such parts at the zero point of the alternating current cycle, so that they remain stationary relative to each other (separated only by the film of the liquid) during alternations of the current, these parts being thus relatively stationary due to the adhesive or "gluing" action of the film of liquid between the parts.

Another object of the present invention is to provide a solenoid operator, energizable by A.C. or D.C., and which is particularly adaptable for operating a valve.

Another object of the present invention is to provide an A.C. electromagnetic operator of the character described above and arranged so that in its operative movements the assembly, comprising the armature and magnetic member connected thereto, slides in close proximity to the wall of a housing containing liquid and its position, while the electromagnet is energized, is determined by magnetic balance of the armature relative to the electromagnet; the liquid then being effective not only to reduce vibration of the assembly along the axis of its operative movement, but also substantially to prevent the hum produced, in the absence of the liquid, by radial vibration of the assembly relative to the housing wall.

Another feature of the invention is the provision of a magnetic member which comprises low-flux-density permanent-magnet material, and means for concentrating the flux produced by the material so that it links more effectively with the other of said members.

Another object of the present invention is to provide a solenoid operator with a permanent magnet carried by an A.C. operated primary armature and arranged to attract a work armature connected to the means to be operated.

Figure 1:
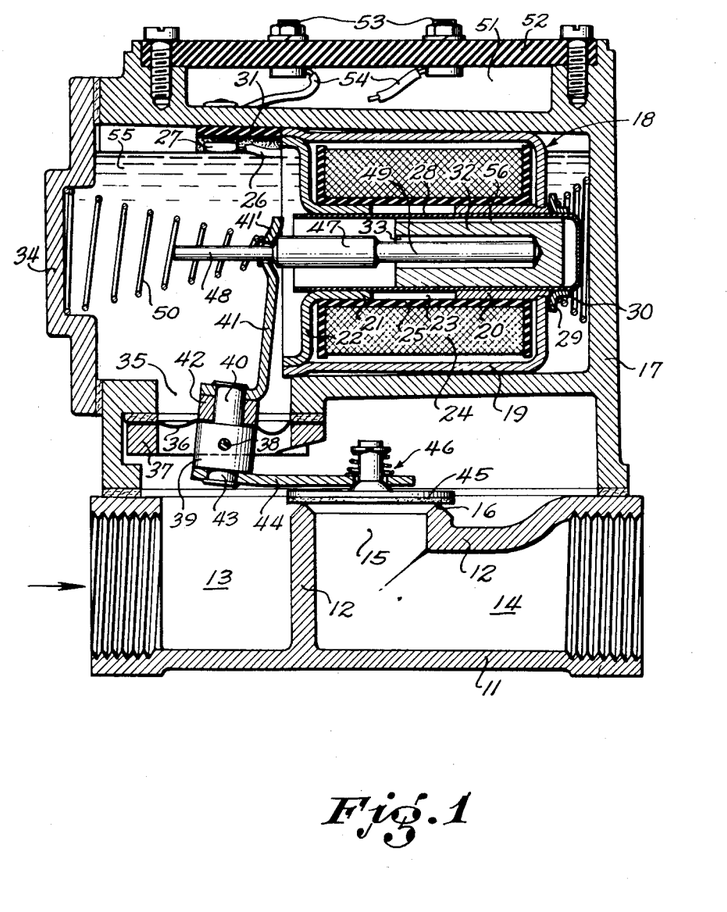
Figure 1 shows a preferred form of apparatus embodying features of the present invention.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

*Description of Figure 1*

In Figure 1 of the drawings the numeral 11 indicates a valve casing having a passage therethrough which is divided by an angled partition 12 to form an inlet chamber 13 and an outlet chamber 14, the horizontal portion of the partition having a port 15 around whose inlet end a valve seat 16 is raised.

Mounted on the valve casing, so as to enclose the open top thereof, is a hollow body 17 which is formed at its right-hand end to provide a generally-cylindrical cavity or socket for a solenoid device or electromagnet generally indicated at 18, the solenoid device and the socket being tapered conformingly and so that when the device is seated there is a space between its right-hand end and the adjacent side wall of the body.

The solenoid device 18 has a magnetic frame comprising a cup-shaped outer shell 19, a tubular member 20 inside the shell and rigidly secured at its outer end in a central opening through the end wall of the shell, and another tubular member 21 inside the shell in alignment with member 20 and having at its outer end a flange portion 22 fitting the mouth of the shell and secured thereto as by welding. The inner ends of the tubular members 20, 21 are spaced apart to provide a magnetic air-gap 23. In the annular space between shell 19 and members 20, 21 is an energizing coil 24 wound on a bobbin 25 and having leads which extend, through openings and notches (not shown) in the shell, to sub-terminals insulatingly and sealingly mounted in openings through the top wall of body 17, one of these leads and subterminals being indicated at 26 and 27, respectively.

Fitting snugly inside the tubular frame-members 20, 21 is a cylindrical guide-tube 28, of thin nonmagnetic material, which is closed at its right-hand end and has adjacent that end of a surrounding collar 29 soldered thereto and abutting the outer end of the tubular member 20. A spring 30, compressed between this collar and the adjacent wall of the body, serves to maintain the guide tube in place inside the magnetic frame, and also to maintain the left-hand end of the solenoid device in abutment with the edge of an insulating strip 31 which forms part of the means for mounting the sub-terminals 27. Freely reciprocable inside the guide tube 28 is a cylindrical armature or magnetic plunger 32 having a deep axial recess 33.

In the left-hand wall of body 17 is a large opening closed by a cap 34, and in the bottom of the body is an opening 35 leading to the inlet chamber 13 of the valve casing and closed by a circular flexible diaphragm 36 clamped to the underside of the body by an annular member 37 fastened by screws (not shown). Pivoted on a pin 38 mounted in openings in member 37 is a cylindrical member 39 whose reduced upper portion 40 extends through a central opening in a diaphragm 36 and an opening in the bent lower part of a vertical arm 41 and is riveted over at its top to fasten these parts together, a spacer 42 being provided between arm 41 and the diaphragm. Secured to the underside of the pivoted member 39, by means of a rivet portion 43 on the bottom of the member, is a horizontal arm 44 which carries on its free end a closure disk 45 cooperable with the valve seat 16; there being a floating connection 46, of conventional form, between the arm and the closure disk.

The top portion 41' of arm 41 is cupped to provide a socket for a rounded shoulder on a rod 47 at the junction between this rod and a reduced left portion 48 thereof which projects loosely through an opening in the socket 41', the right reduced end-portion 49 of the rod projecting loosely into the plunger-recess 33 and having a rounded tip engageable with the bottom of the recess. The L-shaped lever composed of parts 39—44 is biased in clockwise direction, and closure 45 to seated position, by the force of a spring 50 compressed between arm 41 and the cap 34.

In the top of body 17 is a shallow recess 51 covered by a plate 52, conveniently of insulating material, on which is mounted a pair of terminals 53 whose inner ends are connected by wires 54 to the subterminals 27 for coil 24. The hollow interior of body 17 is almost filled with a viscous liquid indicated at 55. To permit relatively unrestricted passage of this liquid between opposite ends of the plunger 32, the same has a groove 56 in its outer surface; in place of, or in addition to, this groove an opening may be provided in the end wall of tube 28 and an opening in between the shell 19 and its socket as shown in the aforementioned application Serial No. 606,115, so that in any event there may be a passage for relatively free flow of oil between opposite ends of plunger 32. Such free flow passage may be considered to be in effect a bypass passage around the thin film of oil between the plunger and its guide tube 28. This thin flow of oil is instrumental in quelling hum at all times that the solenoid is electrically energized.

The parts are shown in normal position in Figure 1 of the drawings. When current is passed through coil 24, the plunger is attracted leftward to a position wherein it bridges the air-gap 23 and floats magnetically in that position, the lever 39—44 accordingly being rocked counterclockwise to unseat closure 45. When coil 24 is deenergized, the parts return to the positions shown in the drawing under the force of spring 50. By arranging the pivot 38 of lever 39—44 generally in the plane of diaphragm 36, variations of fluid pressure in the valve casing, or in the sealed housing defined by body 17, has but little tendency to effect rocking of the lever.

In the absence of the liquid 55, operative movements of the plunger and closure would be substantially instantaneous, and when energized by alternating current the plunger would vibrate not only along its axis of operative movement, but also radially into and out of engagement with the guide tube because of inevitable unbalance of the alternating flux linking the plunger. But when suitable viscous liquid is provided in the reservoir formed by the interior of body 17, this liquid, in the form of a viscous film in the clearance space between the plunger and the guide tube, causes operative movements of the plunger to be retarded and vibration of the plunger to be virtually eliminated.

In general, considering, as before, the analogy to a "low-pass mechanical filter," the degree of viscosity of the liquid necessary to produce the desired result depends on the area of the cooperating surfaces of the guide tube and the plunger, and on the clearance between these parts; by increasing the area or by decreasing the clearance, the degree of viscosity may be decreased.

There is a clearance space between the plunger and its guide for at least a thin film of the liquid in order for it to be effective for these purposes. As mentioned before, it is the area of the cooperating annular surfaces of the plunger and guide that mainly determines the degree of viscosity of the liquid necessary to produce the desired delay of operation and to eliminate A.C. vibration of the plunger under given load conditions.

To produce a relatively compact structure, I have found that it is highly desirable to employ liquid whose viscosity is high by comparison with, for example, that of ordinary lubricating or transformer oils. While liquids such as petroleum oils may be employed, those of the silicone type (such as the methyl silicone fluids) are preferred because of the small change of viscosity of these silicone liquids over a wide range of temperatures that may be encountered in various applications of the solenoid devices.

In practical embodiments of the invention substantially as shown in the drawings in Figure 1 (but of one-half the size) and employed as gas valves, with a silicone liquid rated at 12,500 centistokes viscosity, and diametrical plunger-clearance of .005–.008 inch, the opening time of the valves is about 2 seconds and their closing time about 4 seconds; there being no appreciable hum when the solenoid is energized by alternating current.

By increasing the length and/or diameter of the plunger, or by decreasing the plunger-clearance, the same results may be achieved by the use of liquid whose viscosity is lower. Preferably the liquid used has a high viscosity in the order of at least one thousand centistokes so that relatively small cooperating surface areas and relatively large clearance spaces may be used and maintained within not too exacting tolerances in production. The groove 56 in the plunger is of a size to permit free communication of the liquid between the ends of the plunger and does not appreciably influence the rate of operation which is determined substantially by the viscosity of the liquid, the extent of the cooperating adjacent areas on the plunger and guide tube and the spacing between such areas.

It will be observed that during the entire stroke of plunger 32, it is confined entirely in the plunger tube 28 so that the cooperating areas between the two are not diminished and, hence, the thin film of viscous liquid between the same prevents the production of any substantial audible hum at any time during which the solenoid is energized, regardless of the particular position of the plunger.

*Description of Figures 2–5*

In Figures 2–5, the numeral 111 indicates a valve casing having an inlet 112 and an outlet 113 which are divided by a ported partition 114 providing a valve seat 115. Covering the open top of the valve casing is an electromagnetic operator which includes a circular housing 116, of magnetic material, which is fastened by its flange to the casing (by means of screws 117, Figure 4) with the margin of a flexible diaphragm 118 therebetween. On the underside of the diaphragm is a closure disk 119 which cooperates with valve seat 115 and is fastened to the diaphragm by a hollow screw 120 threaded in a central opening in a disk 121, of magnetic material, on top of the diaphragm.

Figures 2, 3, 4, 5:
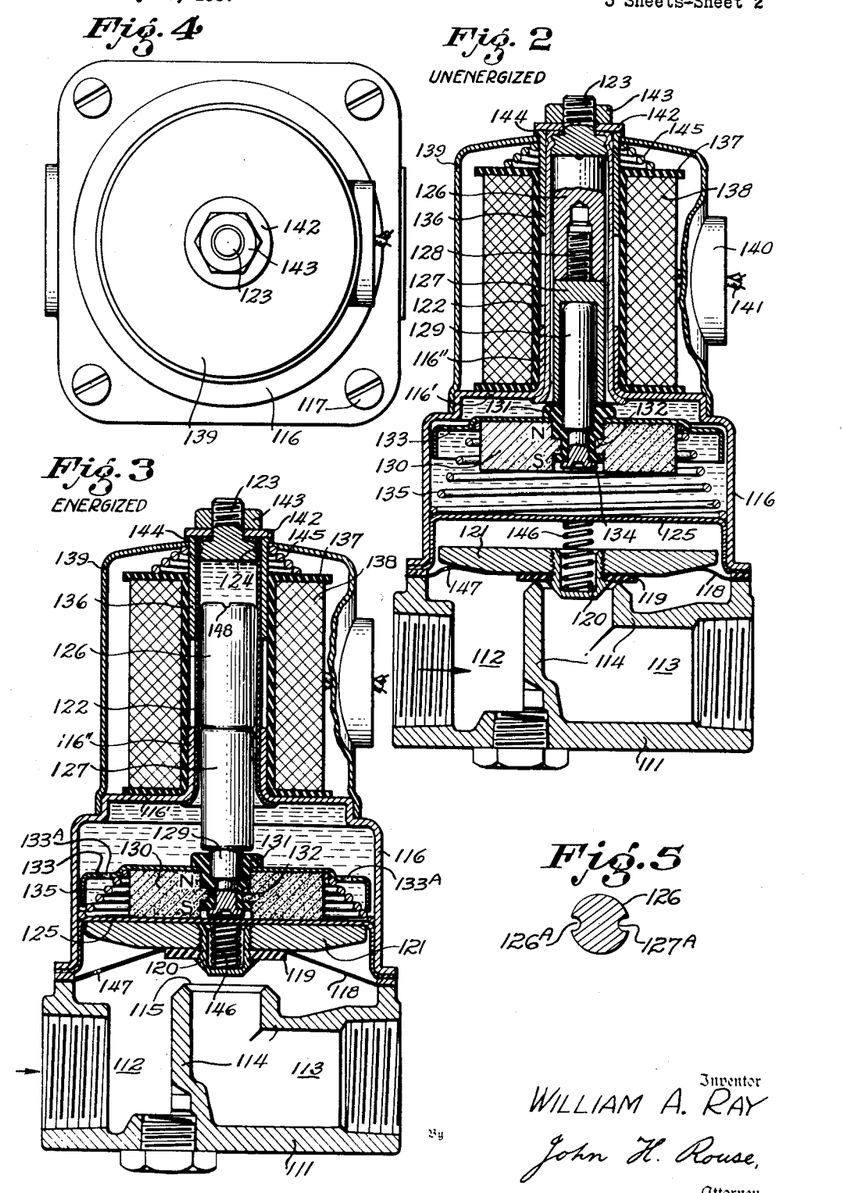
Figures 2 and 3 show a second form of apparatus embodying features of the present invention with the parts in unenergized and energized positions, respectively.
Figure 4 is a top plan view of the apparatus shown in either Figure 2 or Figure 3.
Figure 5 illustrates details of construction of the plunger shown in either Figure 2 or Figure 3.

The housing 116 has an integral top wall 116' and centrally thereof a tubular projection 116". Fitting tightly inside the projection 116" is a thin-walled tube 122, of nonmagnetic material, whose bottom end is flared and sealingly joined to the housing as by solder. At its upper end, the tube 122 is closed by the head of a short screw 123 preferably of nonmagnetic material, the top extremity of the tube being folded inwardly over the shoulder of the screw head and soldered thereto. To strengthen the connection, the periphery of the screw head may be grooved and the wall of the tube rolled into the groove, as is indicated at 124.

Near its bottom the housing 116 is closed by a horizontal plate 125, of relatively thin nonmagnetic material such as brass, which is cupped at its margin to fit the side wall of the housing and has at its bottom a flange which is interposed between the valve casing and the flange of housing 116.

Inside of housing 116 and tube 122 is a movable assembly which comprises a pair of interconnected plungers 126 and 127 freely reciprocable in tube 122, plunger 126 being of magnetic material, while plunger 127 is of nonmagnetic material such as brass and has on its top a projection 128 tightly threaded in an opening in plunger 126; the lower portion of plunger 127 being bored to loosely receive a rod 129 of nonmagnetic material which carries on its lower end a disk-shaped permanent magnet 130, preferably of the so-called "ceramic" type composed of material such as barium-iron oxide powder, and polarized as indicated in the drawings (Figures 2 and 3).

The permanent magnet 130 has a central opening wherein is disposed a bushing 131 of rubber-like elastic material, the opening being restricted intermediate its ends to provide an annular tongue 132 cooperating with a circumferential groove in the bushing to hold the same in place. On top of the permanent magnet, and held there by the flanged top end of bushing 131, is a shallow perforated inverted cup 133 of magnetic material whose side wall is close to the side wall of housing 116. The stepped lower portion of rod 129 fits snugly in the corresponding opening through bushing 131 and is riveted over at its bottom, as indicated at 134, to hold it in place. Compressed between cup 133 and plate 125 is a spring 135 which biases the assembly (comprising magnetic plunger 126 and permanent magnet 130) upwardly to its position as shown in Figure 2.

Around the upper end of plunger-tube 122 is a sleeve 136, of magnetic material, whose diametric dimensions are substantially the same as those of the tubular projection 116", and fitting around these parts is a bobbin 137 on which a solenoid 138 is wound. Surrounding the solenoid is a bonnet 139, of magnetic material, having at its side a conduit-fitting 140 through which the leads 141 of the solenoid extend. The lower end of the bonnet 139 fits snugly around a shouldered portion of the top wall of housing 116, the bonnet having in its top an opening through which the sleeve 136 is inserted in assembly of the structure, this sleeve being held down by a washer 142 backed by a nut 143 threaded on screw 123, and having at its top a narrow flange 144 bearing on the top wall of the bonnet and holding the bonnet securely in place. A spring 145, compressed between the bobbin 137 and the top wall of bonnet 139, serves to hold the solenoid in place.

The enclosed space, defined by plate 125, housing 116, tube 122 and the head of screw 123, is completely or partly filled with a suitable liquid such as oil, of the character previously described, so that at all times there is a thin film of oil disposed in the entire annular space between the magnetic plunger 126 and tube 136 for purposes of quelling audible hum, as previously described in connection with Figure 1. For purposes of allowing relatively free flow of such oil around opposite ends of the plunger assembly involving elements 126, 127 and 130, relatively large openings 133A are provided through the top wall of cup 133, and the plungers 126 and 127 are provided with aligned grooved portions 126A, 127A (indicated in Figure 5) to thereby establish a so-called bypass passage around, not only the oil film between plunger 126 and tube 122, but also around the oil film between the flange of element 133 and casing 116. To avoid any vacuum effect between the top surface of plunger 126 and the head of screw 123, the top of the plunger may be grooved as indicated at 148.

While solenoid 138 is unenergized, the movable assembly consisting of magnetic plunger (or primary armature) 126, permanent magnet 130 and magnetic cup 133, and the nonmagnetic connection 127, 129, 131, is held in raised position by the force of spring 135.

Upon passage of current through the solenoid, the plunger 126 is attracted downwardly toward the center of the solenoid so that the permanent magnet is brought into engagement with plate 125 which serves as a stop for the movable assembly when it is attracted. Even when the permanent magnet is in its raised position of Figure 2, it is virtually outside of the field of the solenoid, as that field is substantially confined by the magnetic housing-parts 116'—116", bonnet 139, sleeve 136 and plunger 126. As the permanent magnet approaches the stop plate, its magnetic force becomes effective to raise the magnetic disk (or work armature) 121 into engagement with the stop plate against the force of bias spring 146, thereby unseating closure 119. The parts are then in the positions shown in Figure 3. To avoid the effect of fluid pressure on the underside of diaphragm 118, the same is provided with a pressure-equalizing opening 147 through which fluid can pass into and from the work-armature compartment above the diaphragm. By making opening 147 relatively small, the impact of work armature 121 is substantially reduced.

The cup 133 on top of the permanent magnet, being of magnetic material, aids transfer to the side walls of housing 116 of the flux produced by the magnet, so that there is a path of relatively low reluctance for the flux linking the permanent magnet and the work armature 121. The flange of plate 125, being of nonmagnetic material, provides a positive air gap between the work armature and the housing and prevents the possibility of magnetic sticking of these parts when the permanent magnet is retracted upon deenergization of the solenoid.

The density of the flux produced by permanent magnet 130 is relatively low but this flux is distributed over a large area and links effectively with the large area of the work armature. By this arrangement the permanent magnet has a "soft" action which is effective through a relatively long working gap.

It will be observed that the thin film of oil between plunger 126 (also plunger 127) and the tube 122 serves, as in Figure 1, as a means whereby audible hum is prevented, the oil being analogous to a "fluid flue" or analogous to an element of a "low-pass mechanical filter," as previously alluded to. It will be also observed that the thin oil film between casing 116 and the flange on the perforated cup 133 serves also as a means, acting in essentially the same manner, in quelling audible hum, i.e., for maintaining the movable assembly against both radial and axial vibration.

The spring 135 is arranged in a manner to center cup 133 and the lower part of the assembly. The steady flux linking the permanent magnet and the work armature, and holding these parts together when the assembly is in attracted position, also contributes to the quelling of vibration of the assembly. The vibration-absorbing rubber bushing 131 is designed to permit tilting of the permanent magnet sufficient to ensure uniform seating of the same on plate 125.

The structure shown could be modified, as by making both of plungers 126 and 127 of magnetic material, to effect raising of the assembly, and resultant release of the work armature, when the solenoid is energized. However, the arrangement described hereinbefore is preferred.

Figure 6:
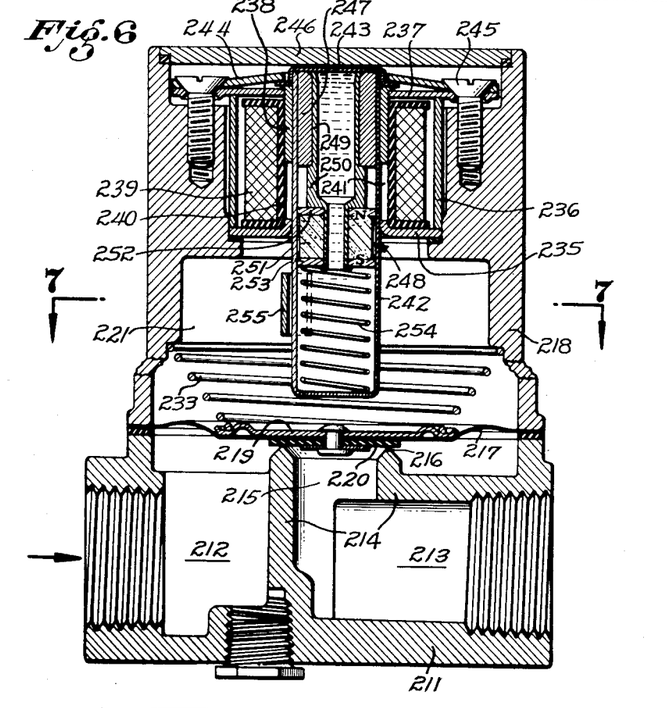
Figure 6 shows a third form of apparatus embodying features of the present invention.
Figure 7:
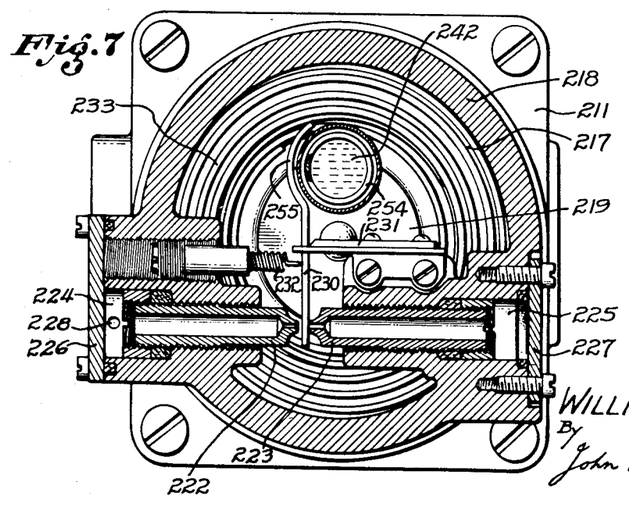
Figure 7 is a sectional view taken on line 7—7 of Figure 6.

Description of Figures 6 and 7

Referring to Figures 6 and 7 of the drawings, the numeral 211 indicates a valve casing having an inlet 212 and an outlet 213 separated by an angled partition 214 having a port 215 around whose upper end is a knife-edged valve seat 216. Clamped to the open top of the valve casing, with the margin of a flexible diaphragm 217 therebetween, is a hollow body 218. Secured to the underside of diaphragm 217, and backed by a stiffening plate 219, is a closure disk 220 cooperable with the valve seat 216.

In a chamber 221 defined by body 218 and diaphragm 217 is a three-way pilot valve for controlling, in a usual manner, the pressure in this chamber and thereby the operative movements of the diaphragm and closure 220. This pilot valve comprises a pair of opposed jets 222 and 223 adjustably and sealingly mounted in openings 224 and 225 in thickened side portions of body 218, these openings being closed at their outer ends by plates 226 and 227. Jet 222 communicates with the inlet 212 of the valve casing by way of a passage whose outlet end is indicated at 228, and the jet 223 communicates with the atmosphere at the outside of the structure by way of a passage which is not shown since its inlet end is above the cutting plane of Figure 7.

For controlling flow through the jets 222, 223 there is a closure arm 230 fulcrumed intermediate its ends on a blade 231 mounted on the body, the closure arm having an end portion extending between the jets and being biased by a compression spring 232 into seating engagement with the jet 223. With the pilot valve in the condition shown, inlet jet 222 being open, diaphragm 217 is depressed (and closure 220 seated) under the force of a spring 233 compressed between the diaphragm and a shoulder in body 218, since the fluid pressure is the same on both sides of the diaphragm. Assuming that the main inlet 212 is connected to a source of pressure fluid, such as fuel gas, when the closure arm 230 is rocked (by means to be described) to its alternate position in engagement with jet 222, the fluid in chamber 221 can escape to atmosphere through the open jet 223 and the diaphragm is raised by the pressure of the fluid below it and port 215 is opened.

Inside of the upper part of body 218 is an A.C. electromagnet which includes a hollow annular frame formed by four parts, each of magnetic material: (1) a bottom washer 235 whose outer margin rests on a gasketed shoulder in the body, (2) an outer tube 236 resting on the outer margin of washer 235, (3) a top washer 237 resting on and overlapping the outer tube 236, and (4) an inner tube 238 having at its top a narrow flange resting on the inner margin of the top washer 237. Inside of the annular frame is a solenoid 239 wound on a bobbin 240.

The bottom of the inner tube 238 is spaced from washer 235 to provide a magnetic air gap 241.

The opening formed by the turned-up inner margin of washer 235 is aligned with, and of the same size as, the opening through tube 238, and fitting closely in these openings is the upper part of an elongated cylindrical housing 242, of thin nonmagnetic material, which is closed at its bottom and has on its top a flanged cap 243 sealingly secured thereto as by solder. Above the top of the magnetic frame is another washer 244, of resilient metal, which is secured to the body 218 by screws 245 in aligned openings through washers 244 and 237. The inner margin of washer 244 bears, through the flange of cap 243, on the flanged top of tube 238, thereby clamping the annular frame and the cylindrical housing 242 securely in place. The open top of body 218 is closed by a plate 246 secured to the body by recessed screws (not seen).

Fitting freely inside the cylindrical housing 242 is an assembly comprising a cylindrical armature or plunger 247 and a cylindrical magnetic member, generally indicated at 248, which are interconnected by a tubular member 249, of nonmagnetic material, having a thickened medial portion 250 spacing the plunger and magnetic member apart, and end portions which extend through axial openings in these parts and are flared at their outer ends to hold the assembly together. The magnetic member 248 consists of a permanent magnet 251 of the so-called "ceramic" type molded of material such as barium-iron oxide powder, and a pair of magnetic end-plates 252 and 253 which serve to concentrate the relatively-low flux, capable of being produced by such material, at the polar ends of the member indicated by the letters. The assembly 247—253 is biased upwardly, to its normal position as shown in Figure 6, by the force of a spring 254 below it.

Upon passage of current through solenoid 239 the plunger 247 is attracted downwardly to a position wherein it bridges the air gap 241 and the magnetic member 248 is alongside of the curved end portion 255 of the pilot-valve closure-arm 230. This arm is of magnetic material and its portion 255 is disposed closely adjacent housing 242 so that the flux of the permanent magnet links effectively with the arm-portion 255 and causes clockwise snapping or rocking of arm 230 to its alternate position and thereby opening of the diaphragm valve as described above. When the solenoid is deenergized the assembly returns to its raised position under the force of spring 254, and the pilot-valve arm is released.

The electromagnetic operator of Figures 6–7, as so far described and without the use of viscous liquid, is effective and reliable but is productive of objectionable hum when energized by alternating current. Such hum is caused by axial vibration of the assembly and also by radial vibration of the assembly due to the inevitable unbalance of the alternating flux around the plunger which causes periodic attraction of the same toward one side of the housing. It is to be observed that such vibration of the assembly has no appreciable effect on the pilot-valve arm because of the constant flux of the permanent magnet which also tends to hold the lower end of the assembly stationary.

However, by providing viscous liquid in the housing, the hum is eliminated. The liquid prevents separation of these parts at the zero point of the A.C. cycle (as under a lateral component of the force of bias spring 254). The liquid may be such as ordinary machine oil when the parts between which it forms a film have a relatively large mutual area, but obviously other viscous liquids may be employed to meet various conditions. The housing is preferably filled with the liquid which, in the operative movements of the assembly, passes freely through the tubular member 249. Such tubular member 249 serves to intercommunicate the ends of the movable armature assembly and thus, in effect, as in the previously described arrangements, serves as a bypass passage which bypasses the thin film of oil between the plunger and the tube.

The use of viscous liquid to prevent separation or vibration of magnetic parts linked by alternating flux is applicable also to an electromagnetic operator wherein the armature (instead of floating magnetically as in the arrangement described) is attracted directly into engagement with the stationary core of the electromagnet, or with a wall of a liquid-containing housing therebetween.

The permanent magnet could be of different construction from that shown, or polarized in a different direction, but the arrangement shown is preferred. Further, it is not necessary that the magnetic member 248 inside housing 242 include a permanent magnet, since the effect would be substantially the same if member 248 were of magnetic material having low remanence and the cooperating portion 255 of the pilot-valve arm were in the form of a permanent magnet. Still further, the member 248 and the portion 255 could both be permanent magnets arranged in attracting or repelling relation to each other. The magnetic member inside the oil-filled housing could, if desired, be connected to the solenoid plunger by means of a lever and arranged so that it is moved into and out of good flux-linking relation to another magnetic member at the outside of the housing.

It will be observed that in each of the three arrangements shown herein, a thin layer or film of viscous fluid, e.g., oil, is interposed between the plunger and guide tube for hum quelling purposes and that in each instance there is an unrestricted fluid passage around the ends of the plunger, such unrestricted passage extending around the ends of the plunger and being in the nature of a bypass for such thin fluid film so as to avoid any "dashpot effect." Valve means, however, may be interposed in such bypass to obtain a more controlled movement of the plunger at lower rates as shown in my above mentioned copending application, Serial No. 606,115. Further, it is observed that in each of the arrangements shown herein the plunger is "free floating" in its energized condition, i.e., the plunger does not engage or stop. However, as shown in my copending application, Serial No. 611,543, this hum quelling feature is achieved where the plunger does engage a stop in its energized condition.

It is understood, of course, that successful operation of the arrangements described and alluded to in my copending applications does not depend on the establishment or proving of any particular theory of operation, although two different theories are advanced above, involving: (1) the analogy of the thin layer or film of oil as being an element of a low pass mechanical filter based on the fact that such film allows movement of the plunger at a relatively low rate by either the biasing spring or the electromagnet, but substantially prevents or eliminates, due to attenuation, damping or other effects, movement of the plunger at a high rate, i.e., in timed relationship with alternations of the alternating current which would otherwise occur if the thin film were absent, and (2) the analogy of the thin film or layer of oil as being an adhesive and producing a "gluing effect" by virtue of its thinness, viscosity and the large surface areas contacted by such viscous fluid.

It will be obvious, using the teachings herein, that the plunger may move with respect to the solenoid winding as shown herein or the plunger may be stationary and the solenoid winding be movable.

While it is preferred that such thin hum quelling film of viscous liquid be between the plunger and guide tube as shown in all of the arrangements disclosed because of the relatively large available contact surfaces on which the film may act, the thin film may be placed elsewhere between relatively movable parts as shown, for example, in Figure 3, wherein the oil film present between the outer flange of member 133 and the stationary casing 116 contributes to the quelling of hum. In this respect, it will be observed that the apertured portions in the element 133, as in the other hum quelling arrangements using a thin film of viscous fluid, provide a bypass around the ends of such thin film so that retarded movement at low rates may be considered as being due substantially entirely to the resistance to "shearing" or adhesive nature, i.e., "gluing effect" of the thin film.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an A.C. solenoid operator: an elongated solenoid plunger arranged for operative movements between alternate positions; a housing having a portion telescopically receiving said plunger and forming a guide for said plunger in its operative movements; liquid in said housing; the viscosity of said liquid being so high, and the area of the cooperating surfaces of said guide and said plunger being so large, that shearing stress developed in the liquid in the clearance space between said surfaces serves to retard operative movements of the plunger and to prevent audible A.C. vibration of the plunger which would otherwise occur; and means defining a passage, independent of said clearance space, providing continuously such freedom of communication of the liquid between the ends of the plunger that a dashpot effect is avoided and the retarded movement of the plunger depends substantially entirely on said shearing stress.

2. An A.C. solenoid operator according to claim 1 wherein the viscosity of said liquid is at least 1000 centistokes at room temperature.

3. In an A.C. solenoid operator: a guide tube; a solenoid plunger reciprocable in said guide tube between alternate operative positions and biased to one of said positions; solenoid means for producing an alternating magnetic field around said tube and plunger for attracting the plunger to the other of its operative positions, said magnetic field being arranged so that the plunger floats magnetically in the tube when attracted; means forming with the interior of said tube a reservoir for liquid; liquid in said reservoir; the viscosity of said liquid being so high, and the area of the cooperating surfaces of said guide tube and said plunger being so large that shearing stresses developed in the liquid in the clearance space between said surfaces is resisted by said liquid and A.C. vibration of the plunger which otherwise would occur is prevented while it is in said balanced position; and means defining a passage, independent of said clearance space, providing continuously such freedom of communication of the liquid between the ends of the plunger that a dashpot effect in said clearance space is avoided.

4. A hum-free solenoid structure energized by alternating current comprising a magnetic structure, an armature attracted by and telescopically received within said magnetic structure, a liquid disposed in a clearance space between said armature and magnetic structure, the viscosity of said liquid being such as to allow movement of said armature relative to said magnetic structure at a relatively slow rate but to prevent relative movement between said magnetic structure and said armature at a high rate which is commensurate with the frequency of said alternating current, and means defining space for such free circulation of the liquid relative to the armature that said slow rate movement of the same is independent of any dashpot effect in said clearance space.

5. A hum-free solenoid structure energized by alternating current comprising a magnetic structure, an armature attracted by and telescopically received within said magnetic structure and maintained in a magnetic balanced condition with respect thereto when said magnetic structure is energized by alternating current, a liquid disposed in a clearance space between said magnetic structure and said armature, the viscosity of said liquid being such as to allow movement of said armature relative to said structure at a low rate but to prevent movement of said armature relative to the structure at a high rate which is commensurate with the frequency of the alternating current, and means defining space for such free circulation of the liquid that said low-rate movement of the armature is independent of any dashpot effect in said clearance space.

6. In a solenoid operated mechanism wherein a magnetic structure is excited with alternating current to produce relative movement between the structure and an associated armature, the combination comprising means for freely floating the armature telescopically within the magnetic structure in magnetic balanced relationship to said structure in the excited condition of said magnetic structure, and a thin static liquid film disposed in a clearance space provided by and between said armature and said structure allowing relative movement at a slow rate between said structure and said armature but preventing movement of said armature with respect to said magnetic structure at a high rate which is commensurate with the frequency of the alternating current.

7. A hum-free solenoid structure energized by alternating current comprising a magnetic structure; an armature attracted by said magnetic structure and telescopically received within said structure; a reservoir containing liquid; a thin film of said liquid disposed in a clearance space between said armature and said magnetic structure and serving to substantially prevent movement of said armature with respect to said magnetic structure at a rate commensurate with alternations of said alternating current by allowing movement of said armature with respect to said magnetic structure at a slower rate; and a bypass circuit around the ends of said thin film and in communication with said reservoir so that the liquid in said space is not disturbed appreciably when said armature is moved at said slower rate.

8. A hum-free structure energized by alternating current comprising a stationary element and a movable element telescopically arranged within said stationary element; means effective upon energizing one of said elements with alternating current for producing relative movement between said elements; a thin static liquid film disposed in a clearance space provided by and between said elements and allowing relative movement therebetween at a low rate but preventing substantial relative movement therebetween at a high rate which is commensurate with the frequency of said alternating current.

9. A hum-free solenoid structure energized by alternating current comprising a stationary element and a movable element telescopically arranged within said stationary element; first means effective upon energizing one of said elements with alternating current for producing relative movement from a first position to a second position; means normally biasing one of said elements towards said first position; a thin static liquid film disposed in a clearance space provided by and between said elements and allowing relative movement therebetween by either said biasing means or said first means at a low rate but preventing, when said first means is energized with alternating current, substantial relative movement therebetween at a high rate which is commensurate with the frequency of said alternating current either during relative movement of said elements from said first position to said second position or when one of said elements is in said second position.

10. In an arrangement wherein it is desired to quell hum in an alternating current solenoid actuated structure having an element which is telescopically movable with respect to a stationary element, the improvement which resides in having a thin static film of liquid between closely adjacent areas of said elements with the viscosity of such liquid and the extent of such areas being sufficiently large that said thin film of liquid permits relative movement between said elements at a low rate but substantially attenuates or damps all vibratory movement at a high rate which would otherwise be produced in timed relationship with the alternations of the alternating current, and having a relatively unrestricted bypass circuit for the liquid around the ends of said thin film thereof to prevent appreciable movement of said thin film.

11. In an electromagnetic operator: an assembly, arranged for movement along an axis between alternate positions and biased to one of said positions, comprising an elongated magnetic plunger, an elongated first member of magnetic material, and means of low permeance interconnecting said plunger and said first magnetic member in spaced relation and so that they are disposed lengthwise along said axis; an elongated housing, of thin nonmagnetic material, having one portion guidingly receiving said plunger and another portion guidingly receiving said first magnetic member; a solenoid, adapted to be energized by alternating current, around said one housing-portion for attracting said plunger and thereby moving said assembly to the other of its positions; and a second member, also of magnetic material, mounted outside said housing adjacent a side wall of said other housing-portion and adapted to be connected to a device to be operated, said second magnetic member being mounted for movement between alternate positions in a plane generally at right-angles to said axis and in directions toward and away from said side wall of the other housing-portion, said second magnetic member being biased to one of said positions; at least one of said members comprising a permanent magnet; said first member being arranged to move into and out of good flux-linking relation to said second member in the movements of the assembly between its alternate positions and thereby to effect, through said permanent magnet, corresponding movement of the second member.

12. An electromagnetic operator according to claim 11 wherein said other housing-portion is cylindrical and said second magnetic member is curved to conform to the curvature thereof.

13. An electromagnetic operator according to claim 11 wherein said second magnetic member is pivotally mounted for rocking movement in said plane.

14. An electromagnetic operator according to claim 13 wherein said other housing-portion is cylindrical and said second magnetic member is curved to conform to the curvature thereof.

15. An electromagnetic operator according to claim 11 wherein said first magnetic member comprises a body of nonmetallic permanent-magnet material, and a metallic magnetic plate at each of the opposite ends of said body along said axis.

16. An electromagnetic operator according to claim 15 wherein said permanent-magnet body is polarized in a direction substantially along said axis.

17. In an electromagnetic operator: an assembly arranged for movement as a whole along an axis and between alternate positions, said assembly being biased to one of said positions; a solenoid for attracting said assembly to its alternate position and arranged generally along said axis; said assembly comprising an elongated primary armature arranged lengthwise along said axis in the magnetic field of said solenoid, a permanent magnet coaxial with said primary armature and outside of said magnetic field, and means of low permeance interconnecting the primary armature and the permanent magnet; means forming a stop for said assembly when it is in one of said positions, said stop means comprising a plate of relatively thin nonmagnetic material transverse to said axis and engageable at one of its sides by a polar end of said permanent magnet; a work armature at the side of said plate away from the permanent magnet and biased to a position spaced from the plate, said work armature being arranged for attraction toward the plate by the permanent magnet when the assembly is in its stopped position; and a stationary housing, formed in part by said plate, surrounding said movable assembly.

18. An electromagnetic operator according to claim 17 wherein there is means including liquid within said housing for damping movements of the assembly.

19. An electromagnetic operator according to claim 17 wherein the part of said housing adjacent said plate is of magnetic material to aid linkage with said work armature of the flux produced by said permanent magnet.

20. In an electromagnetic operator: an assembly arranged for movement as a whole along an axis and between alternate positions, said assembly being biased to one of said positions and comprising an elongated primary armature arranged lengthwise along said axis, a permanent magnet spaced from said primary armature and coaxial therewith, and an elongated connection of low permeance between the primary armature and the permanent magnet; a tubular member guidingly receiving said primary armature; a solenoid, adapted to be energized by alternating current, around said tubular member for attracting the primary armature and thereby moving said assembly to the other of said positions; means joined to said tubular member and forming an elongated housing around said permanent magnet; means forming a stop for said assembly when it is moved to said other position, said stop means comprising a plate of relatively thin nonmagnetic material engageable by a polar end of said permanent magnet, said plate being in a plane transverse to said axis and being secured to the side walls of said housing so as to provide with the housing and said tubular member an enclosed space around said assembly; and a work armature at the side of said plate away from the permanent magnet and biased to a position spaced from the plate, said work armature being arranged for attraction toward the plate by the permanent magnet when the assembly is moved to said other position.

21. An electromagnetic operator according to claim 20 wherein there is means including liquid within said enclosed space for damping movements of the assembly.

22. An electromagnetic operator according to claim 20 wherein the side walls of said housing adjacent said plate are of magnetic material to aid linkage with said work armature of the flux produced by said permanent magnet.

23. An electromagnetic operator according to claim 22 wherein said permanent magnet has on its end away from said plate means of magnetic material extending in good flux-transfer relation to said magnetic material of the side walls of the housing.

24. An electromagnetic operator according to claim 20 wherein the side walls of said housing adjacent said plate are of magnetic material and are extended beyond the plate and generally parallel to said axis to form a compartment for said work armature.

25. An electromagnetic operator according to claim 24 wherein said work armature is in a plane parallel to that of said plate and of such extent in said plane that the edges of the work armature are in good flux-transfer relation to the side walls of said compartment.

26. An electromagnetic operator according to claim 20 wherein there is means connected to said assembly and cooperating with the side walls of said housing to damp movements of the assembly.

27. An electromagnetic operator according to claim 20 wherein at least a portion of said connection between the primary armature and the permanent magnet is of rubber-like elastic material.

References Cited in the file of this patent

UNITED STATES PATENTS

| | | |
|---|---|---|
| 1,348,842 | Barlow | Aug. 10, 1920 |
| 1,552,375 | Ainsworth | Sept. 1, 1925 |
| 1,721,995 | Harris | July 23, 1929 |
| 1,730,688 | Rippl | Oct. 8, 1929 |
| 2,496,638 | Ray | Feb. 7, 1950 |